(12) United States Patent
Duchatelle et al.

(10) Patent No.: US 8,646,744 B2
(45) Date of Patent: Feb. 11, 2014

(54) STRUCTURAL FRAME FOR A TURBOMACHINE

(75) Inventors: Thierry Francois Maurice Duchatelle, Creteil (FR); Thierry Georges Paul Papin, Varennes-Jarcy (FR); Dominique Raulin, Saint Fargeau Ponthierry (FR); Arnaud Sanchez, Brunoy (FR)

(73) Assignee: SNECMA, Paris (FR)

( * ) Notice: Subject to any disclaimer, the term of this patent is extended or adjusted under 35 U.S.C. 154(b) by 228 days.

(21) Appl. No.: 12/996,562

(22) PCT Filed: May 14, 2009

(86) PCT No.: PCT/FR2009/000564
§ 371 (c)(1),
(2), (4) Date: Dec. 6, 2010

(87) PCT Pub. No.: WO2010/007220
PCT Pub. Date: Jan. 21, 2010

(65) Prior Publication Data
US 2011/0073745 A1    Mar. 31, 2011

(30) Foreign Application Priority Data
Jun. 25, 2008 (FR) ...................... 08/03547

(51) Int. Cl.
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F02C 7/20 | (2006.01) |
| F04D 29/44 | (2006.01) |
| F04D 29/54 | (2006.01) |

(52) U.S. Cl.
USPC .............................. 248/637; 60/796; 415/189

(58) Field of Classification Search
USPC ............ 248/637, 672; 415/137, 209.2, 209.3, 415/209.4, 210.1
See application file for complete search history.

(56) References Cited

U.S. PATENT DOCUMENTS

| 1,061,675 A | * | 5/1913 | Junngren ...................... 415/189 |
| 2,961,150 A | * | 11/1960 | Pirtle ............................ 417/352 |
| 3,398,535 A | * | 8/1968 | Hemsworth et al. ......... 60/226.1 |
| 3,728,041 A | * | 4/1973 | Bertelson ...................... 415/189 |

(Continued)

FOREIGN PATENT DOCUMENTS

| EP | 1 199 440 | 4/2002 |
| EP | 1 548 233 | 6/2005 |
| WO | 92 19854 | 11/1992 |
| WO | 2008 121047 | 10/2008 |

OTHER PUBLICATIONS

International Search Report issued Jan. 7, 2010 in PCT/FR09/000564 filed May 14, 2009.

*Primary Examiner* — Jonathan Liu
*Assistant Examiner* — Taylor Morris
(74) *Attorney, Agent, or Firm* — Oblon, Spivak, McClelland, Maier & Neustadt, L.L.P.

(57) ABSTRACT

A structural frame for a turbomachine, such as an intermediate frame or an exhaust frame, the frame including at least two coaxial rings, an inner ring and an outer ring, together with radial arms interconnecting the rings. At least one of these elements includes a plurality of parts that are fastened together by bolting.

16 Claims, 3 Drawing Sheets

(56) References Cited

U.S. PATENT DOCUMENTS

| | | | |
|---|---|---|---|
| 4,859,143 A * | 8/1989 | Larrabee et al. | 415/142 |
| 4,987,736 A * | 1/1991 | Ciokajlo et al. | 60/797 |
| 5,222,360 A * | 6/1993 | Antuna et al. | 60/226.1 |
| 5,272,869 A * | 12/1993 | Dawson et al. | 60/796 |
| 5,357,744 A * | 10/1994 | Czachor et al. | 60/799 |
| 6,547,518 B1 * | 4/2003 | Czachor et al. | 415/137 |
| 7,124,572 B2 * | 10/2006 | Aycock et al. | 60/39.511 |
| 2002/0044868 A1 | 4/2002 | Marx et al. | |

* cited by examiner

STRUCTURAL FRAME FOR A TURBOMACHINE

BACKGROUND OF THE INVENTION

1. Field of the Invention

The invention relates to a structural frame for a turbomachine, such as in particular a fan frame, an intermediate frame, or an exhaust frame, and it also relates to a turbomachine including a frame of this type.

2. Description of the Related Art

In a turbomachine, such as an airplane turbojet, structural frames are arranged along the drive axis in order to stiffen the turbomachine, in order to avoid distortion of the turbomachine, and thereby transmit thrust forces better to the airplane to which the turbomachine is fastened. By way of example, such structural frames are the intermediate frame and the exhaust frame. The intermediate frame is situated between the low and high pressure compressors, and the exhaust frame is located downstream from a turbine section arranged at the outlet from a combustion chamber.

This type of frame is generally made up at least two coaxial rings, an inner and an outer ring, the inner ring defining the inside of a flow passage for a primary air stream flowing through the turbojet, and the outer ring defining the outside of a flow passage for a secondary air stream that flows outside the turbojet. The inner and outer rings are connected together by arms extending radially through the primary and secondary air streams. An intermediate ring is interposed between the inner and outer rings, it has the arms passing therethrough, and it defines the outside of the passage for the primary stream.

These frames are generally made as one-piece castings. It is also known to make the inner ring, the intermediate ring, and the radial arms as a single piece and then to weld the single-piece outer ring to the radial arms.

Nevertheless, making that type of structural frame becomes increasingly complicated and expensive with increasing diameter of the frame. Furthermore, after casting, lengthy and complex machining operations need to be performed on the outer ring where it has junctions with the arms in order to form tubular projections at those junctions for passing services into the radial arms. Finally, the resulting frame forms a single piece that cannot be taken apart, thereby complicating maintenance operations of the turbomachine.

BRIEF SUMMARY OF THE INVENTION

A particular object of the invention is to avoid those drawbacks in a manner that is simple, effective, and inexpensive.

To this end, the invention provides a structural frame for a turbomachine, such as an intermediate frame or an exhaust frame, made up of elements comprising at least two inner and outer coaxial rings, and radial arms interconnecting the rings, the frame being characterized in that at least one of the rings is made up of a plurality of cylinder portions having circumferential ends that include radial flanges that are fastened by bolting to corresponding radial flanges of the radial arms.

According to the invention, at least one of the rings of the structural frame is made up of a plurality of parts, thereby enabling these parts to be of reduced size, thus making them easier to make as castings and guaranteeing better metallurgical quality for the parts obtained. The structural frame can be disassembled because it is assembled by bolting, thereby simplifying maintenance operations and reducing costs by enabling a damaged part to be replaced on its own.

According to another feature of the invention, the structural frame also comprises an intermediate ring arranged between the inner and outer rings and having the radial arms passing therethrough, the intermediate ring possibly being made up of a plurality of elements fastened together by bolting.

Each radial arm may also be formed of an inner part connecting together the inner and intermediate rings, and an outer part connecting together the intermediate and outer rings.

In an embodiment of the invention, the inner and intermediate rings and the inner parts of the radial arms are made as a single piece.

According to another feature of the invention, the radially inner end of the outer part of each arm includes a base bolted to a corresponding base at the outer end of the inner part of the radial arm.

The radially-outer end of the outer part of each arm may include a soleplate extending circumferentially and including a tubular projection for passing services that communicates with the inside of the outer part of the arm.

The outer projection for passing services is thus incorporated in the arm, which is simpler than providing a projection incorporated in an outer one-piece ring of the prior art.

The circumferential edges of each soleplate may include respective radial flanges bolted to corresponding radial flanges of cylinder portions of the outer ring.

The inner and outer rings and the radial arms may be made out of different materials, which is not possible with one-piece structural frames obtained by casting. The use of different materials makes it possible to compensate for the extra weight due to the bolts and the bases on the inner and outer parts of the radial arms.

The inner and outer rings and the radial arms may also be made using different techniques such as casting, forging, and powder metallurgy. In a variant, these elements may be made of composite material.

This type of structural frame made up of a plurality of parts is particularly adapted to frames having a diameter that is greater than 110 centimeters (cm).

The invention also provides a turbomachine such as a turbojet or a turboprop, characterized in that it includes a frame as described above.

The invention also provides elements of a structural frame for a turbomachine, comprising coaxial rings and radial arms interconnecting the rings, the elements being characterized in that they include parts for fastening together by bolting.

BRIEF DESCRIPTION OF THE SEVERAL VIEWS OF THE DRAWINGS

The invention can be better understood and other details, advantages, and features of the invention appear on reading the following description made by way of non-limiting example with reference to the accompanying drawings, in which.

DETAILED DESCRIPTION OF THE INVENTION

Figure 1:
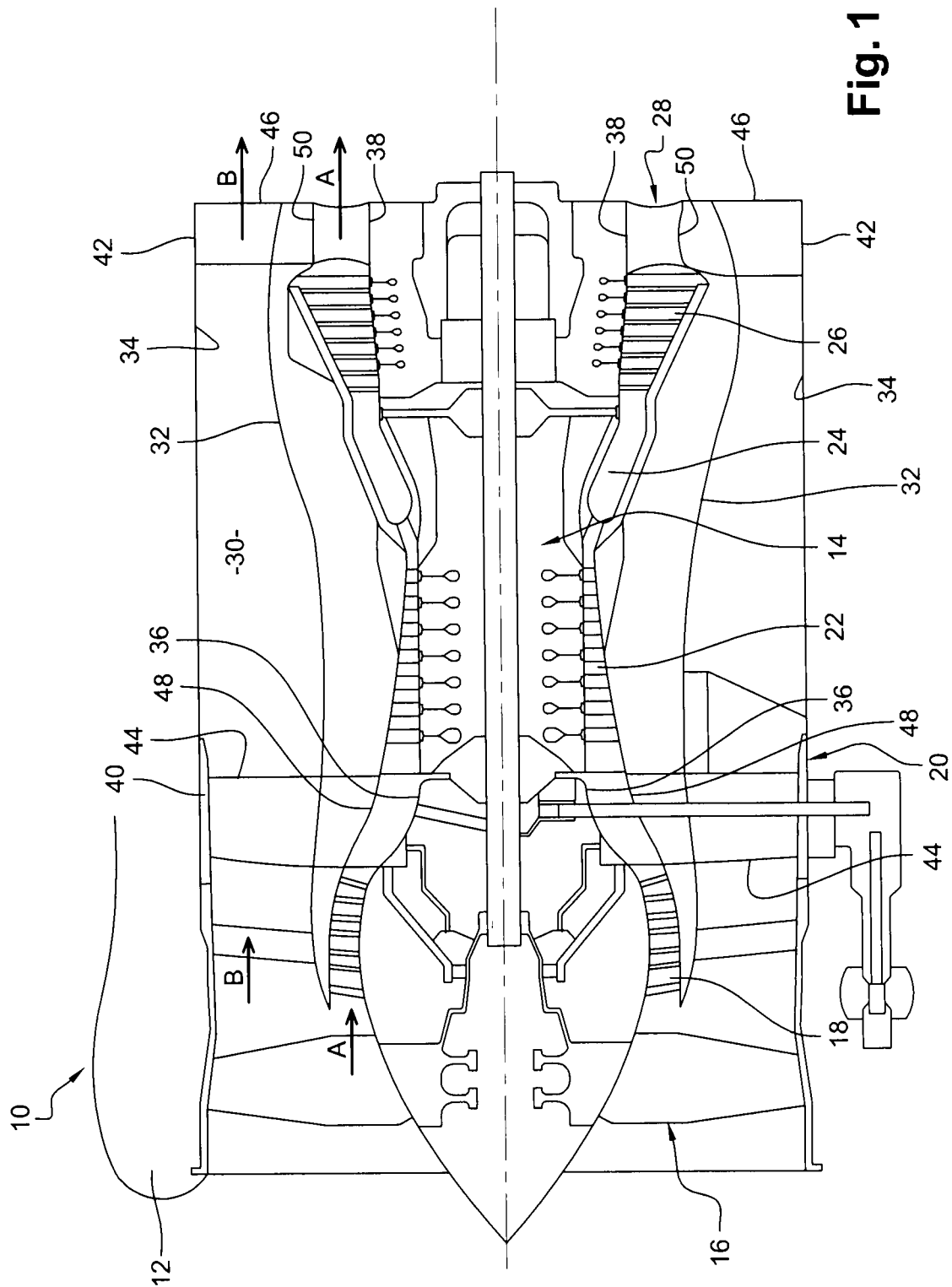
FIG. 1 is a diagrammatic axial section of a bypass turbomachine.

FIG. 1 shows a bypass turbomachine 10 comprising nacelle 12 of cylindrical shape surrounding a turbojet 14 and a fan wheel 16 mounted upstream from the turbojet 14, which turbojet essentially comprises, from upstream to downstream: a low pressure compressor 18, an intermediate frame 20, a high pressure compressor 22, a combustion chamber 24, a turbine 26, and an exhaust frame 28.

In operation, the fan wheel 16 driven by the turbine 26 sucks in a stream of air that divides into a primary air stream (arrows A) that passes through the turbojet 14, and a secondary air stream (arrows B) that flows along a fan duct 30 inside the nacelle 12 towards the rear and around the turbojet 14.

The fan duct 30 is made up of two substantially cylindrical walls that are coaxial, respectively an inner wall 32 and an outer wall 34.

The intermediate frame 20 and the exhaust frame 28 are structural frames serving to stiffen the turbomachine in order to limit distortion thereof in operation. Each of the intermediate and exhaust frames 20 and 28 comprises a pair of coaxial rings, inner rings 36, 38 and outer rings 40, 42 that are disposed one inside the other and that are connected together by radial arms 44, 46. The downstream end of the outer ring 40 of the intermediate frame 20 is connected to the outer wall 34 of the fan duct 30, which is itself connected to the upstream end of the outer ring 42 of the exhaust frame 28.

Each of the intermediate and exhaust frames 20 and 28 has a respective intermediate ring 48, 50 arranged between its inner and outer rings 36, 38 and 40, 42 with the radial arms 44, 46 passing through the intermediate ring. The inner parts of the radial arms of the intermediate and exhaust frames 20 and 28 are situated in the primary air stream (arrows A), while the outer parts are situated in the secondary air stream (arrows B).

The inner rings 36, 38 and the intermediate rings 48, 50 of the intermediate and exhaust frames 20 and 28 define respectively the inside and the outside of the flow passage for the primary air stream (arrows A). The outer rings 40, 42 of the structural frames 20, 28 define the outside of the flow passage for the secondary air stream (arrows B).

In the prior art, a structural frame is conventionally made as a single casting, which is found to be increasingly complicated and expensive with increasing diameter.

The invention enables that drawback and the above-mentioned drawbacks to be remedied by the fact that at least one of the component elements of the structural frame, i.e. one of the inner rings 36, 38, intermediate rings 48, 50, and outer rings 40, 42, and also the radial arms 44, 46 is made up of a plurality of parts that are assembled together by bolting.

Figure 2:
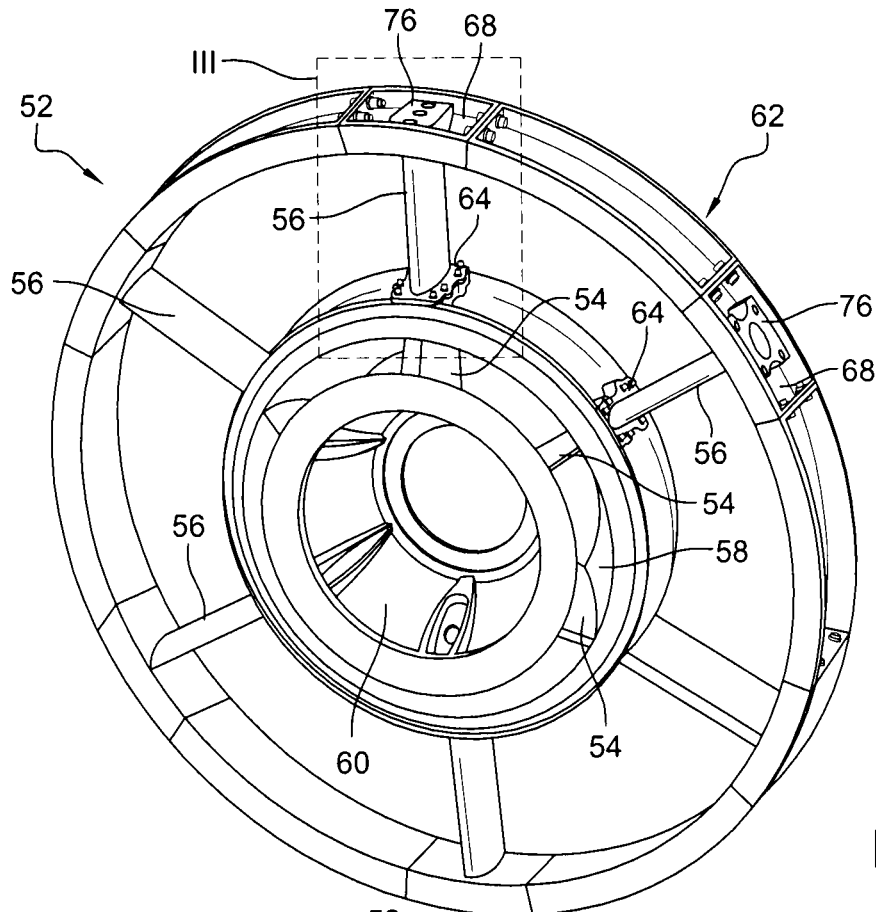
FIG. 2 is a diagrammatic perspective view seen from upstream of a structural intermediate frame of the invention.
Figure 3:
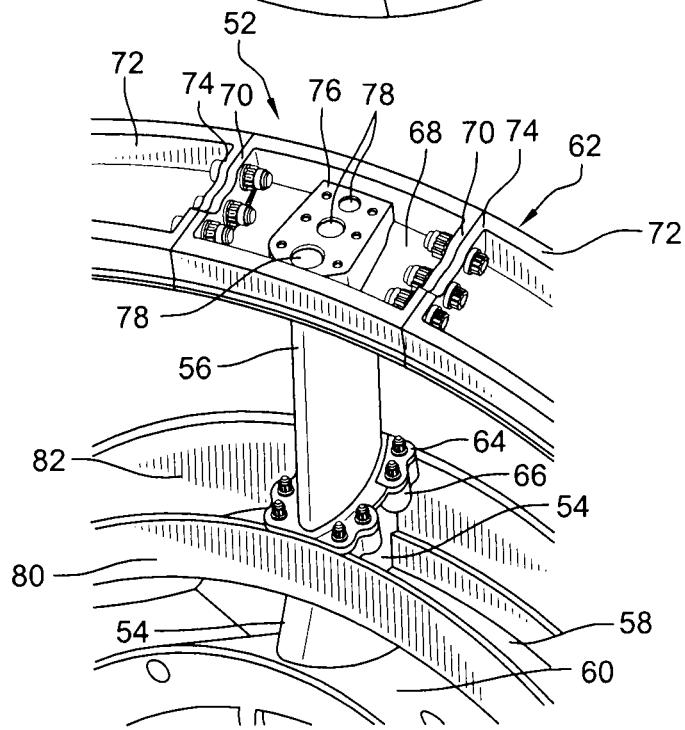
FIG. 3 is a diagrammatic perspective view of a larger scale of the zone III identified in FIG. 2.

FIGS. 2 and 3 show a structural intermediate frame 52 made up of a plurality of parts. The radial arms are made of two parts each, and they comprise respective inner parts 54 having outer ends that pass through the intermediate ring 58 and that are connected to respective outer parts 56. The inner part 54 of each arm connects the inner ring 60 to the intermediate ring 58, while the outer part 56 thereof connects the intermediate ring 58 to the outer ring 62.

The outer part 56 of each radial arm includes at its inner end a circumferential base 64 that is bolted radially onto a circumferential base 66 at the outer end of the inner part 54 of the arm. Each outer part 56 includes at its outer end a soleplate 68 having its circumferential ends including radial flanges 70.

The outer ring 62 is made up of a plurality of cylinder portions 72 of channel section that are open towards the outside of the turbomachine. These cylinder portions 72 have radial flanges 74 at their circumferential ends (FIG. 3).

The radial flange 74 at one circumferential end of a cylinder portion 72 is fastened by bolting to a radial flange 70 of the soleplate 68 of an outer part 56 of a radial arm, and the other circumferential end of the cylinder portion 72 is fastened by bolting to a circumferential end of the soleplate 68 of the outer part 56 of an adjacent arm. The assembly made up of the cylinder portions 72 fastened to the soleplate 68 constitutes the outer ring 62.

Each soleplate 68 has a tubular projection 76 having orifices 78 that communicate with the inside of the outer part 56 of a radial arm and that provide passages for oil pipes or electrical cables.

The intermediate ring 58 has walls 80 and 82 at its upstream and downstream ends that extend radially outwards. Cylindrical fairing panels (not shown) are mounted on these radial walls 80, 82 between the outer ends of the inner parts 54 of two consecutive radial arms in order to form internally the inner wall of the fan duct 30.

The inner ring 60, the inner parts 54 of the radial arms together with the intermediate ring 58, and the radial walls 80, 82 are made as a single piece.

Figure 4:
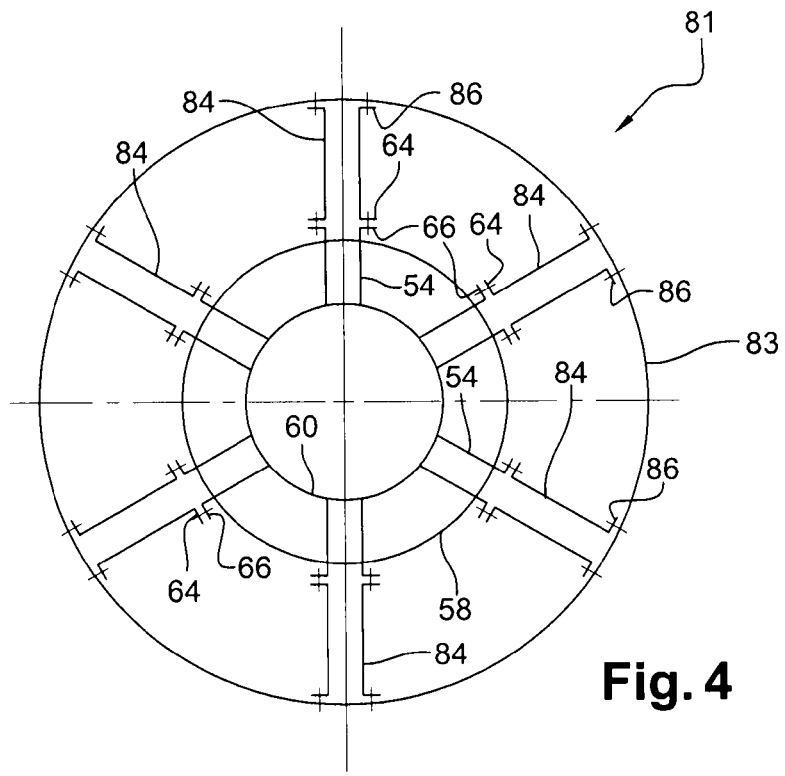
FIG. 4 is a diagrammatic cross-section view of a structural exhaust frame of the invention.

FIG. 4 is a diagram of a structural exhaust frame 81 in which the inner ring 60, and the intermediate ring 58 together with the inner parts 54 of the radial arms are formed as a single piece. The outer ring 83 is also made as a single piece. In a manner similar to the structural intermediate frame 52 shown in FIGS. 2 and 3, the inner end of the outer part 84 of each radial arm has a base 64 bolted to a base 66 at the outer end of the inner part 54 of the arm. The outer end of the outer part 84 of each arm also has a soleplate 86 bolted radially to the outer ring 83. As in FIGS. 2 and 3, projections for passing services are formed on the soleplates 86 and pass through the outer ring 83, which can be achieved simply and serves to guarantee good sealing for the oil flowing through the orifices in the projections.

Figure 5:
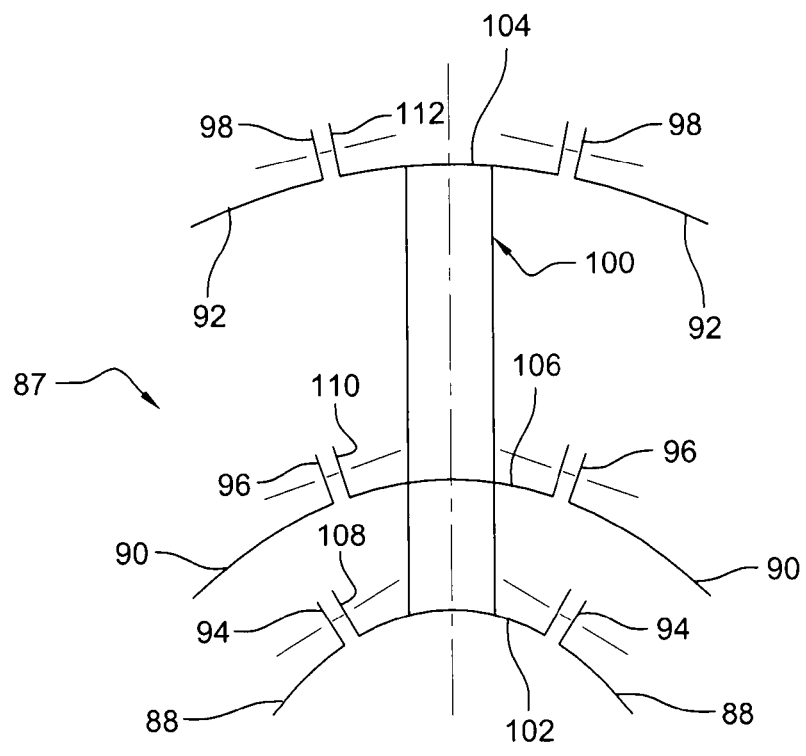
FIG. 5 is a fragmentary diagrammatic view in cross-section of a variant embodiment of a structural exhaust frame.

Another variant embodiment of a structural exhaust frame 87 is shown in FIG. 5. In this figure, the inner, intermediate, and outer rings are made up of a plurality of cylinder portions 88, 90, 92 having circumferential ends including radial flanges 94, 96, 98. Each radial arm 100 is made as a single piece and includes an inner soleplate 102 and an outer soleplate 104 at its inner and outer ends respectively, together with an intermediate soleplate 106 located about one-third of the way along the length of the arm 100 from the inner end of the arm 100. The inner, intermediate, and outer soleplates 102, 106, and 104 have radial flanges 108, 110, 112 at their circumferential ends for fastening to the radial flanges 94, 96, 98 of the cylinder portions 88, 90, 92 of the inner, intermediate, and outer rings.

The structural frames shown in the drawings may have inner, intermediate, and outer rings together with radial arms made out of materials that are different, thereby making it possible to compensate for the increase in weight due to adding fasteners for bolting. The various parts of the inner, intermediate, and outer rings and of the radial arms may likewise be made of different materials.

The component elements of a structural frame and the various parts of these component elements may be made by various different techniques such as casting, forging, and powder metallurgy, or they may be made of composite material.

The invention is particularly advantageous for turbomachines in which the structural frames present a diameter greater than about 110 cm.

The invention also makes it possible to ensure that casting is used only for making pieces that are of small dimensions such as the cylinder portions or the radial arms made up of one or two parts. The invention also makes it possible to dismantle the structural frame simply during a maintenance operation because of the way its various pieces are assembled together by bolting.

The projections 76 for passing services are incorporated in the soleplates 68, 86 of the outer parts 56, 84 of the radial arms and no longer in the outer ring as in the prior art, thus making them simpler to make and avoiding a machining stage that is lengthy and complicated.

Other embodiments of structural frames can be devised without going beyond the ambit of the invention. In particular, it is possible to combine the embodiments of FIGS. 2 and 5 to make a structural frame having inner, intermediate, and outer rings made up of a plurality of cylinder portions 88, 90, 92, together with radial arms each comprising two parts, i.e. an inner part 54 and an outer part 56.

The inner and intermediate rings and the inner parts of the radial arms may be made as a single piece fastened to the outer parts of the radial arms that are formed integrally with the outer ring.

In another variant of the invention, the intermediate ring may be formed as a single piece together with the radial arms integral therewith, while the inner and outer rings are bolted to the inner and outer ends of the radial arms.

In yet another variant of the invention, the intermediate and outer rings may be made as a single piece together with the radial arms, this single piece being bolted to a one-piece inner ring.

The invention is not limited to embodiments having an intermediate ring as shown in the drawings. The structural frame could have only two rings, i.e. an inner ring and outer ring, interconnected by radial arms, as occurs with certain exhaust frames. Under such circumstances, the outer ring is connected directly to a turbine frame and defines the outside of the flow passage for the primary air stream.

The invention claimed is:

1. A structural frame, an intermediate frame, or an exhaust frame, for a turbomachine, comprising:
    inner and outer coaxial rings; and
    radial arms interconnecting the rings, each of the radial arms comprising a soleplate at an end of the radial arm, the soleplate extending circumferentially and including first and second radial flanges disposed at first and second circumferential ends of the soleplate and extending axially from an upstream end to a downstream end of the sole plate, an upstream wall disposed at an upstream end of the soleplate and extending circumferentially from the first circumferential end to the second circumferential end, and a downstream wall disposed at a downstream end of the soleplate and extending circumferentially from the first circumferential end to the second circumferential end,
    wherein at least one of the rings includes a plurality of cylinder portions extending circumferentially and having circumferential ends that include radial flanges that are fastened by bolting to corresponding radial flanges of the soleplate of each of the radial arms, and
    wherein a circumferential distance between the first and second circumferential ends of each soleplate is less than a circumferential distance between the circumferential ends of each cylinder portion.

2. A frame according to claim 1, further comprising an intermediate ring arranged between the inner and outer rings and having the radial arms passing therethrough, the intermediate ring including upstream and downstream radial walls disposed at upstream and downstream ends of the intermediate ring.

3. A frame according to claim 2, wherein the intermediate ring includes a plurality of elements that are fastened together by bolting.

4. A frame according to claim 2, wherein each radial arm includes an inner part connecting together the inner and intermediate rings, and an outer part connecting together the intermediate and outer rings.

5. A frame according to claim 4, wherein the inner and intermediate rings and the inner parts of the radial arms are made as a single piece.

6. A frame according to claim 4, wherein a radially-inner end of the outer part of each arm includes a base bolted to a corresponding base at an outer end of the inner part of the radial arm extending between the upstream and downstream radial walls of the intermediate ring.

7. A frame according to claim 4, wherein a radially-outer end of the outer part of each arm includes the soleplate, the soleplate including a tubular projection having orifices that communicates with an inside of the outer part of the arm.

8. A frame according to claim 1, wherein the inner and outer rings and the radial arms are made out of different materials.

9. A frame according to claim 1, wherein the inner and outer rings and the radial arms are made using different techniques selected from casting, forging, and powder metallurgy.

10. A frame according to claim 1, having a diameter greater than 110 cm.

11. A turbomachine, a turbojet, or a turboprop, comprising a frame according to claim 1.

12. A structural frame, an intermediate frame, or an exhaust frame, for a turbomachine, comprising:
    inner and outer coaxial rings; and
    radial arms interconnecting the rings,
    wherein at least one of the rings includes a plurality of cylinder portions extending circumferentially and having circumferential ends that include radial flanges that are fastened by bolting to corresponding radial flanges of the radial arms,
    wherein the outer ring includes the plurality of cylindrical portions with the radial flanges at each of the circumferential ends of each of the cylinder portions of the outer ring, the cylindrical portions presenting a channel section that are open towards an outside of the turbomachine,
    wherein a radially outer end of each of the radial arms includes a soleplate extending circumferentially, the soleplate including first and second radial flanges disposed at first and second circumferential ends of the soleplate and extending axially from an upstream end to a downstream end of the sole plate, an upstream wall disposed at an upstream end of the soleplate and extending circumferentially from the first circumferential end to the second circumferential end, and a downstream wall disposed at a downstream end of the soleplate and extending circumferentially from the first circumferential end to the second circumferential end,
    wherein the first radial flange at the first circumferential end of the soleplate is fastened by bolting to a radial flange of a first cylinder portion, and the second radial flange at the second circumferential end of the soleplate is fastened by bolting to a radial flange of a second cylinder portion, and
    wherein a circumferential distance between the first and second circumferential ends of each soleplate is less than a circumferential distance between the circumferential ends of each cylinder portion.

13. A frame according to claim 12, wherein the soleplate includes a tubular projection having orifices that communicates with an inside of the arm.

14. A structural frame, an intermediate frame, or an exhaust frame, for a turbomachine, comprising:
- an inner ring;
- an outer ring coaxial with the inner ring;
- an intermediate ring disposed between and coaxial with the inner and outer rings, the intermediate ring including upstream and downstream radial walls disposed at upstream and downstream ends of the intermediate ring; and
- radial arms interconnecting the rings,
- wherein the inner, intermediate, and outer rings are each made up of a plurality of cylinder portions with circumferential ends including radial flanges,
- wherein each radial arm includes an inner soleplate at an inner end of the radial arm, an outer soleplate at an outer end of the radial arm, and an intermediate soleplate located along the arm between the inner soleplate and the outer soleplate, the inner, intermediate, and outer soleplates each extending circumferentially and circumferential ends of each of the inner, intermediate, and outer soleplates including radial flanges,
- wherein the radial flanges of each of the inner, intermediate, and outer soleplates are fastened by bolting to the radial flanges of the radial flanges of the cylinder portions of the inner, intermediate, and outer rings, respectively, and
- wherein a circumferential distance between the circumferential ends of each of the inner, intermediate, and outer soleplates is less than a circumferential distance between the circumferential ends of each of the cylinder portions of the inner, intermediate, and outer rings, respectively.

15. A frame according to claim 14, wherein each radial arm is made as a single piece.

16. A frame according to claim 14, wherein the outer soleplate includes a tubular projection having orifices that communicates with an inside of the arm.

* * * * *